Feb. 6, 1968   W. GRAHAM ETAL   3,368,192
VIBRATION SUPPRESSION APPARATUS AND METHOD
Filed Nov. 18, 1964

INVENTORS
WALTON GRAHAM
BRUCE BINGHAM
BY
*Darby and Darby*
ATTORNEYS

United States Patent Office 3,368,192
Patented Feb. 6, 1968

3,368,192
VIBRATION SUPPRESSION APPARATUS AND METHOD
Walton Graham, Roslyn, N.Y., and Bruce Bingham, Oxon Hill, Md., assignors, by mesne assignments, to the United States of America as represented by the Secretary of the Navy
Filed Nov. 18, 1964, Ser. No. 412,601
4 Claims. (Cl. 340—8)

This invention relates to a method and apparatus for rigidifying structures, particularly sonar arrays, by the use of mechanical resonators.

The invention is particularly useful for rigidifying a ship's hull to reduce vibrations interfering with the operation of a ship's sonar system, particularly a sonar of the end-fire phased array type. Conventonal sonar equipment employs an underwater transducer to transmit a sound signal of a preselected frequency. If a target is within the range and in the path of this signal, a reflected impulse echoes back to the transducer. The bearing, time delay between the transmitted and echoed signals (and optionally the Doppler frequency) of the return signal may then be fed into a computer for a fire control or navigational solution.

These underwater sonic signals tend to create small but significant vibrations in the hull of the ship, and particularly in the "baffle" or support for the transducer elements, which impair the performance of the sonar equipment by decreasing the effectiveness of the transducer elements. When the sonar echo is received from a position generally other than broadside of the ship, especially when an array of transducers is used where the transducers are aligned substantially on the axis of the ship, sensitivity is markedly reduced due to the less than infinite rigidity of the hull supporting the transducers. The reason for the loss of sensitivity is that the hull vibrations tend to create spurious signals in the transducers which are generally out of phase and subtractive with respect to the signals received from the target, thus causing weakening of the target signal or erroneous apparent direction of the target.

Ideally, the hull surrounding the transducer should be perfectly rigid to preclude these spurious signals in the transducer. This is not feasible, since the hull would have to be built to a thickness which would be prohibitively heavy and costly. According to the present invention adequate rigidity in predetermined frequency ranges can be obtained by using mechanical resonators as hull stiffening devices. Such resonators may be attached to the hull to create a sufficiently hight "impedance" (a term used herein for analytical purposes and which may be loosely interpreted as equivalent to rigidity) at the hull adjacent the transducers to reduce hull vibrations to an acceptable level.

One form of these resonators is a piston-shaped attachment connected directly to the inner surface of the hull adjacent the transducers. The dimensions, mass and physical characteristics of these resonators may be selected in a manner described below to provide maximal impedance over a desired bandwidth of vibration frequency consistent with reasonable costs for manufacture and assembly and consistent with weight limitations for the ship involved.

The invention will be more fully discussed and understood in the following detailed description, which is to be read in connection with the accompanying drawings, wherein.

Figure 1:
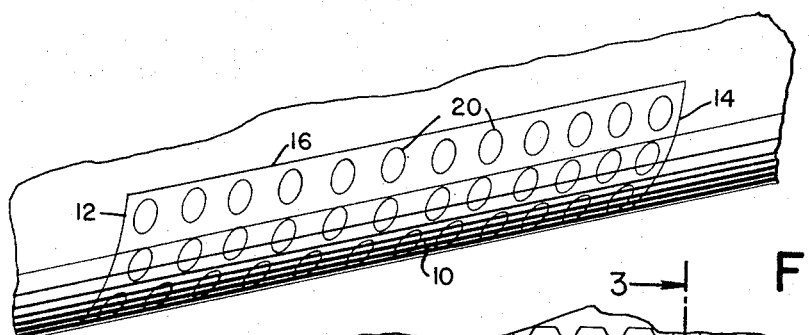
FIGURE 1 is a perspective view of a portion of a ship's hull, e.g. an elongated keel compartment containing an array of sonar transducers.

FIGURE 1 illustrates a portion of a ship's hull at the keel and in the forward part of the ship, commonly referred to as a sonar compartment, generally designated 8. Sonar compartment 8 comprises an outer baffle 10, front baffle 12, rear baffle 14 and overhead 16. All baffles are built and assembled in a conventional manner to maintain water-tight integrity.

Positioned in outer baffle 10 is an array of sonar transducers 20 which transmit sonar signals and receive echoes reflected from a target. Transducers 20 are arrayed in a manner shown to permit directional transmission and receiving of the sonar signals, the bearings being controlled by electronic means which control the time phase of the actuation of each individual transducer 20.

While this description will be directed principally to a sonar of the end-fire array type, it should be understood that this invention may also be used in connection with suppressing unwanted vibration associated with a single transducer element or with a conventional transducer and sonar dome assembly.

Figure 2:
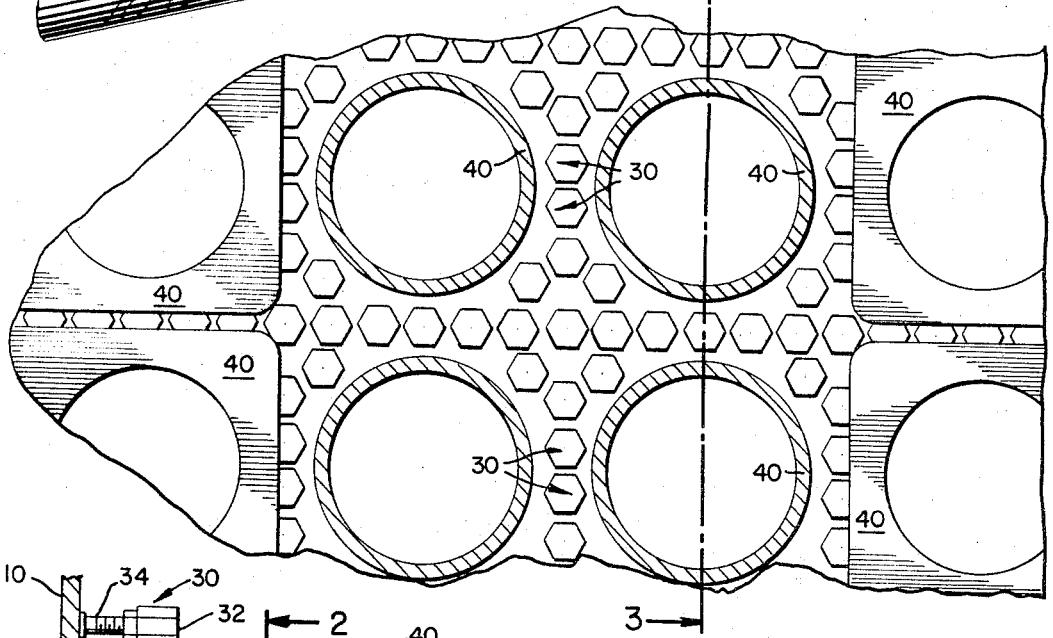
FIGURE 2 is a plan view in partial section of a segment removed from the hull portion depicted in FIGURE 1, the location of the section being indicated by section line 2—2 in FIGURE 3.
Figure 3:
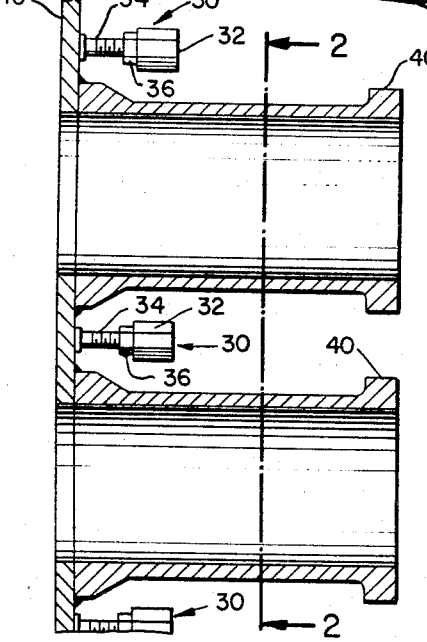
FIGURE 3 is an elevation in partial cross-section of the segment of the ship's hull taken along the line 3—3 in FIGURE 2.

When a sonar signal is transmitted or received by transducers 20, vibrations tend to be created in baffle 10. These vibrations cause a loss of sensitivity in the sonar receiving phase because spurious signals are created by vibration of baffle 10, and with it, transducers 20. This problem is referred to above in the introductory paragraphs. Referring to FIGURES 2 and 3, passive mechanical resonators 30 rigidify baffle 10 to reduce these hull vibrations to a very low and acceptable level. Each resonator 30 comprises hexagonal head 32 supported on strut 34 which is connected to baffle 10 by means of nut 36. The weight, size and location of head 32 and strut 34, and the stiffness of strut 34 are selected to provide the desired rigidity as described below.

Mechanically, each resonator 30 comprises a lumped mass (head 32) that is attached to the surface of the vehicle (baffle 10) by a compliant stud (strut 34). (Parenthetical designations are used to indicate that the particular identification and configuration of these elements is not critical so long as they are properly selected and combined to achieve the desired result in accordance with that discussion.)

It will be appreciated that the separation of mass, i.e. the head, and compliant element, i.e. the stud, is not entirely complete even in the case illustrated and a single unitary stud bar, ridge or other element may supply both mass and compliant coupling.

Electrically, resonator 30 is equivalent to a parallel resonant circuit comprising an inductance in henries equal to the mass (head 32) in kilograms, and a capacitance in farads equal to the compliance in meters/newton of the stud (shaft 34). At the point of attachment to the vehicle surface (baffle 10) resonator 30 at its resonant frequency appears as an infinite impedance.

Mechanically, this action would be represented by a clamp or non-compliant coupling to an infinite mass; that is, the boundary condition at the point of attachment would be zero displacement and thus zero velocity. The net effect for a single resonator 30 is a localized stiffening effect on the vehicle (baffle 10). Correspondingly, a plurality of resonators 30 can be effectively used to stiffen larger areas of a vehicle (baffle 10). It is important to note that the present invention differs from previous vibration suppression techniques in that absorption of energy plays virtually no part in the system of the present invention. A plurality of resonators 30 is especially advantageous for another reason, which is that although the useful bandwidth of an individual resonator 30 may be narrow, the useful bandwidth of a plurality of closely spaced resonators may be broad. Coupling between resonators 30 through the vehicle (baffle plate 10) causes the identical resonant frequencies of individual resonators 30 to migrate in a manner similar to the pole migration in coupled electrical circuits and results in a broadened bandwidth of frequencies over which reduction of vibration occurs.

A resonator attached to a plate at a point can vibrate in either the axial mode in which compressional waves are set up along the axis of the strut, or in a transverse (also called "flexural") mode corresponding to a flexure or swaying of the resonator transversely to the axis of the strut. Similarly, various modes of vibration exist for a sea chest (the housing for a transducer). A resonator attached at a point acts as a secondary source that produces an outgoing displacement wave in response to the displacement at its base (in the axial mode) or in response to the slope at its base (in the transverse mode). If there are several resonators, these secondary waves will produce additional responses at the attachment points, and so on (coupling interactions between resonators).

The response of a resonator in its simplest axial mode of vibration is due to compressional vibrations set up in the resonator material by displacement of the base of its strut. The strength of the response is the magnitude of the total force exerted in opposing unit displacement of the plate to which the strut is attached. The strength of a transverse resonator is the magnitude of the moment it exerts in opposing a unit change of the slope at the resonator attachment point.

The response which is of importance is the axial mode response since the transverse mode resonance is a weak one in comparison to the axial mode response. Since the amount of interaction depends on the products of the "strengths" of the individual resonator responses, the interaction is small for the transverse mode and large for the axial mode. This means that the bandwidth over which suppression of vibration occurs is large for the axial mode and rather small for the transverse mode.

In a successful experimental application of the invention, resonators have been used having hexagonal steel heads 32 which are one inch across the flats and 1¼ inches long. These heads 32 are supported on a 1¼ inch steel stud strut 34 a distance of 1¾ inches off baffle 10, being held in place on the stud by standard nut 36. Resonators 30 in the experimental application are placed on corners of equilateral triangles, the spacing being as large as possible. The number of resonators required consistent with adequate rigidifying of the baffle is set by a rule of thumb approximation that the section of the baffle 10 supported by each set of three resonators 30 should have at least ten times the impedance it has when unsupported. The weight per resonator 30 was chosen to provide a useful bandwidth, it being determined that where the total weight of resonator 30 equalled the weight of corresponding section of baffle 10 (the baffle will characteristically consist of ½ inch steel plate), the impedance of baffle 10 dropped to zero at 1.4 times the resonant frequency. Doubling the resonator mass with appropriate change in the stud compliance will change the ratio to about 1.7. In general, this occurs when the mass of the baffle 10 associated with each resonator 30 and the mass of resonator 30 resonate in parallel with the stiffness of resonator 30. As an example, one may be satisfied with a modest bandwidth of about 30% centered on 3500 cycles/sec. The equal resonator and plate mass design would be likely to satisfy this design criteria. Once the mass per resonator 30 required to achieve the desired bandwidth is selected, the stiffness of stud 34 may be selected to give the desired resonant (i.e. the sonar) frequency. The stiffness (or compliance) is conveniently determined by analogizing mass to inductance and compliance to capacitance and using well known formulae for electrical resonance (parallel) as previously explained.

As shown in FIGURE 2, resonators 30 are positioned between transducers 20 to provide maximum rigidity to baffle 10 directly adjacent the transducers 20. The actual transducer elements are not illustrated in FIGS. 2 and 3, since conventional elements which form no part of this invention are contemplated. Transducers 20 are positioned in water-tight sea chests 40 which house each transducer 20 and provide openings for wiring between transducers and associated electronic equipment. Sea chests 40 may be designed to also serve as mechanical resonators to obtain additional rigidity in baffle 10 at predetermined frequencies. In like matter, other sea chests and necessary attachments to the hull of a ship may be designed to serve this secondary function of rigidifying the hull.

To recapitulate, this invention contemplates the use of a plurality of resonators distributed over the area of the material which is to be stiffened, i.e., vibrations in the material are to be reduced or virtually suppressed by the use of the resonators. One great advantage of the use of a plurality of resonators is the widening of the bandwidth of frequencies over which this reduction of vibration (or stiffening) occurs due to the coupling interaction between resonators.

Furthermore, a wide range of possibilities for reduction of vibration at various frequencies is provided by a plurality of resonators, since the many axial and transverse modes of resonance can be combined in many different combinations.

While this description has been directed to certain specific structures, it should be understood that it relates only to certain preferred embodiments of the invention and that other modifications and improvements thereto will be obvious to those skilled in the art. The above description is given by way of example only, rather than by way of limitation. It is therefore intended that the scope of the invention not be limited by this description but rather to be as recited in the following claims.

What is claimed is:

1. For use in a sonar system of the type wherein an array of transducers is mounted along a hull area of a ship to detect signals arriving thereat from a remote sonic radiation source, a system to eliminate interference caused by vibration of said hull area, induced therein by the arrival of said detected signals, comprising a plurality of mechanical resonators;
each of said resonators comprising a resilient strut and a weight adapted to be positioned along the length thereof, said struts being secured to the inside wall of said hull area around the individual transducers of said array;
said resonators being free to be vibrated whereby said hull area vibrations are damped by asynchronous vibrations of said resonators.

2. The system recited in claim 1 wherein the resonators are arranged in a regular pattern.

3. The system recited in claim 1 wherein the resonators are arranged in a triangular pattern.

4. The system recited in claim 3 wherein said triangular pattern is composed of equilateral triangles.

References Cited

UNITED STATES PATENTS

| | | | |
|---|---|---|---|
| 989,958 | 4/1911 | Frahm | 348—20 |
| 3,091,103 | 5/1963 | Goodwin | 348—358 |
| 3,246,073 | 4/1966 | Bouche et al. | 248—358 X |

RODNEY D. BENNETT, *Primary Examiner.*

CHESTER L. JUSTUS, *Examiner.*

J. P. MORRIS, *Assistant Examiner.*